(12) United States Patent
Asada et al.

(10) Patent No.: US 8,000,184 B2
(45) Date of Patent: Aug. 16, 2011

(54) OPTICAL PICKUP DEVICE AND OPTICAL DISC DEVICE WITH OFFSET COMPENSATION

(75) Inventors: Jun-iti Asada, Hyogo (JP); Seiji Nishiwaki, Hyogo (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 64 days.

(21) Appl. No.: 12/598,779

(22) PCT Filed: Apr. 17, 2008

(86) PCT No.: PCT/JP2008/001008
§ 371 (c)(1), (2), (4) Date: Nov. 4, 2009

(87) PCT Pub. No.: WO2008/139686
PCT Pub. Date: Nov. 20, 2008

(65) Prior Publication Data
US 2010/0135146 A1    Jun. 3, 2010

(30) Foreign Application Priority Data
May 8, 2007 (JP) .................................. 2007-123191

(51) Int. Cl.
*G11B 7/00* (2006.01)
(52) U.S. Cl. ........... 369/44.24; 369/112.01; 369/112.03; 369/112.1; 369/53.23
(58) Field of Classification Search ............... 369/44.24, 369/112.1, 112.03, 112.15, 112.06
See application file for complete search history.

(56) References Cited

U.S. PATENT DOCUMENTS

| 6,856,587 | B2* | 2/2005 | Kim et al. .................... 369/53.3 |
| 2002/0075774 | A1 | 6/2002 | Matsuura |
| 2004/0228236 | A1 | 11/2004 | Saikai et al. |
| 2005/0025028 | A1* | 2/2005 | Hirai et al. ............... 369/112.05 |
| 2005/0195485 | A1* | 9/2005 | Hirai et al. .................... 359/569 |
| 2008/0080357 | A1* | 4/2008 | Tanaka et al. ............ 369/112.23 |

FOREIGN PATENT DOCUMENTS

| JP | 03-245326 | 10/1991 |
| JP | 2000-21014 | 1/2000 |
| JP | 2004-342166 | 12/2004 |
| WO | 2007/072683 | 6/2007 |

OTHER PUBLICATIONS

International Search Report for corresponding Application No. PCT/JP2008/001008 mailed Jul. 29, 2008.
Form PCT/ISA/237.

\* cited by examiner

*Primary Examiner* — Lixi C Simpson
(74) *Attorney, Agent, or Firm* — Renner, Otto, Boisselle & Sklar, LLP

(57) ABSTRACT

When first-order diffracted beams leak into a region, which is for receiving only a zeroth-order diffracted beam from an optical disc, due to positional displacement between an objective lens and a hologram element, an offset compensation signal includes an AC component, the offset compensation signal preferably including a DC component only. Accordingly, there may be caused deterioration in a modulation degree of the tracking error (TE) signal. A partial light shielding element 110 is formed on a hologram surface 112a along boundaries between a light receiving region (121a), which receives a zeroth-order diffracted beam, and light receiving regions (121b, 121c), which receive the zeroth-order diffracted beam and first-order diffracted beams, so as to cover the light receiving region (121a). Further, the partial light shielding element 110 shifts phases of transmitted light beams by $\pi$, whereby the TE signal is offset-compensated, and the modulation degree can be improved.

5 Claims, 11 Drawing Sheets

OPTICAL PICKUP DEVICE AND OPTICAL DISC DEVICE WITH OFFSET COMPENSATION

TECHNICAL FIELD

The present invention relates to an optical pickup device performing, with the use of a laser light source, at least one of reading, writing, and erasing of information on an optical recording medium such as an optical disc or the like, and an optical disc device using the optical pickup device.

BACKGROUND ART

FIG. 5A is a side view showing a schematic configuration of an optical pickup device disclosed in patent document 1, and FIG. 5B is a diagram showing a light source shown in FIG. 5A, as viewed from a VB-VB line.

The optical pickup device 12 shown in FIGS. 5A and 5B is used for an optical disc device that is compatible with a first optical disc 6 and a second optical disc 6' complying with different standards from each other, such as a DVD and a CD, and is designed to perform reading, writing, and/or erasing of information on each of the first optical disc 6 and the second optical disc 6' with the use of light beams having wavelengths corresponding to the respective standards. Specifically, the optical pickup device 12 includes: a photo detector 9 which generates an electrical signal corresponding to the intensity of received light; a laser light source 1 which is disposed on the photo detector 9 and which emits a first laser beam having a wavelength of $\lambda 1$ and a second laser beam having a wavelength of $\lambda 2$ ($\lambda 2 > \lambda 1$); a reflecting mirror 10 disposed on the photo detector 9; a collimating lens 4; a polarization hologram element 2; a ¼ wavelength plate 3; and an objective lens 5.

In the case of using the first optical disc 6, the laser light source 1 emits the first laser beam (wavelength $\lambda 1$) from a light emitting point 1a. The emitted first laser beam is reflected by the reflecting mirror 10 fixed on the photo detector 9 toward a direction perpendicular to a detection surface 9a of the photo detector 9, and enters the collimating lens 4. The light having entered the collimating lens 4 is converted into substantially parallel light, transmitted through the polarization hologram element 2, and enters the ¼ wavelength plate 3. The ¼ wavelength plate 3 converts the entered linearly polarized light (an S-wave or a P-wave) into circularly polarized light. The light emitted from the ¼ wavelength plate 3 is converged by the objective lens 5, and forms a spot on a signal surface 6a of the first optical disc 6. The light reflected by the signal surface 6a is transmitted through the objective lens 5, and is again converted into linearly polarized light (the P-wave or the S-wave) by the ¼ wavelength plate 3, and then enters a hologram surface 2a of the polarization hologram element 2. The light having entered the polarization hologram element 2 is diffracted by the hologram surface 2a. The diffracted light is split into a first-order diffracted beam 8 and a minus first-order diffracted beam 8' which are symmetric about a symmetry axis, i.e., an optical axis 7 of the first laser beam, and both of the diffracted beams are transmitted through the collimating lens 4 and enter the detection surface 9a of the photo detector 9.

On the other hand, in the case of using the second optical disc 6', the laser light source 1 emits the second laser beam (wavelength $\lambda 2$, $\lambda 2 > \lambda 1$) from the light emitting point 1a'. The emitted second laser beam is reflected by the reflecting mirror 10 fixed on the photo detector 9, and converted by the collimating lens 4 into substantially parallel light. The light emitted from the collimating lens 4 is transmitted through the polarization hologram element 2, and is converted by the ¼ wavelength plate 3 into circularly polarized light. The circularly polarized light is converged by the objective lens 5, and forms a spot on the signal surface 6a' of the second optical disc 6'. The light reflected by the signal surface 6a' is transmitted through the objective lens 5, and is again converted by the ¼ wavelength plate 3 into the linearly polarized light (the P-wave or the S-wave), and the linearly polarized light enters the hologram surface 2a of the polarization hologram element 2. The light having entered the polarization hologram element 2 is diffracted by the hologram surface 2a. The diffracted light is split into a first-order diffracted beam 11 and a minus first-order diffracted beam 11' which are symmetric about a symmetry axis, i.e., an optical axis 7' of the second laser beam, and both of the diffracted beams are transmitted through the collimating lens 4 and enter the detection surface 9a of the photo detector 9.

FIG. 6 is a diagram showing a schematic configuration of the hologram surface 2a shown in FIG. 5A, as viewed from a VI-VI line. In FIG. 6, chain lines indicate positions, on the hologram surface 2a, where the zeroth-order diffracted beam and plus and minus first-order diffracted beams emitted from the second optical disc 6' enter, in the case of using the second laser beam.

On the hologram surface 2a, a diffraction region of a circular shape is formed. The diffraction region is divided into four regions by two straight lines (an x-axis extending in a radial direction of the optical disc, and a y-axis extending in a direction perpendicular to the x-axis) which are perpendicular to each other at a point 20 where the optical axis 7 passes through. Further, each of the regions corresponding to respective quadrants on an x-y coordinate system is divided into three regions, and accordingly, in the quadrants, regions 21a to 21c (first quadrant), regions 22a to 22c (second quadrant), regions 23a to 23c (third quadrant), and regions 24a to 24c (fourth quadrant) are formed, respectively.

The zeroth-order diffracted beam and the plus and minus first-order diffracted beams, all of which are diffracted by the optical disc, enters the hologram surface 2a. However, the regions, where the zeroth-order diffracted beam and the plus and minus first-order diffracted beams enter, vary depending on the cases where the first laser beam is used and where the second laser beam is used.

First, in the case where the first laser beam (first optical disc 6) is used, the regions 21a, 22a, 23a, 24a, 21b, 22b, 23b, and 24b receive only the zeroth-order diffracted beam, which is reflected due to a shape of a track on the signal surface 6a and is not subjected to diffraction, whereas the remaining regions 21c, 22c, 23c, and 24d receive the zeroth-order diffracted beam and one first-order diffracted beam (either the plus first-order diffracted beam or the minus first-order diffracted beam) from the first optical disc 6.

Next, in the case where the second laser beam (second optical disc 6') is used, the regions 21a, 22a, 23a, and 24a receive only the zeroth-order diffracted beam, which is reflected due to a shape of a track on the signal surface 6a' and is not subjected to diffraction, whereas the remaining regions 21b, 22b, 23b, 24b, 21c, 22c, 23c, and 24c receive the zeroth-order diffracted beam and the first-order diffracted beams from the second optical disc 6'. When the objective lens 5 and the polarization hologram element 2 are displaced with respect to each other, the first-order diffracted beams enter the regions 21a, 22a, 23a, and 24a, and thus to prevent the entrance, the size of each of the regions 21b, 22b, 23b, and 24b is increased to include a predetermined amount of margin, compared to regions (chain lines) which respectively receives the zeroth-order diffracted beam and the first-order diffracted beams.

FIGS. 7 and 8 are diagrams each showing a detection pattern and a detected light distribution on the photo detector 9 shown in FIG. 5A. FIG. 7 shows a case where the first laser beam is used, whereas FIG. 8 shows a case where the second laser beam is used.

For convenience of explanation, positions on the detection surface 9a are indicated with the use of an x-y coordinate system. That is, as shown in FIGS. 7 and 8, an intersection point between an optical axis 7 of the first laser beam and the detection surface 9a is defined as a point 90, and two straight lines perpendicular to each other at the intersection point are defined as an x-axis and a y-axis. Further, point 90' is an intersection point between the optical axis 7' of the second laser beam and the detection surface 9a.

In a region on the y-axis positive side on the detection surface 9a, focus detection cells F1a, F2a, F1b, F2b, F1c, F2c, F1d, and F2d are located. Polarities of the focus detection cells are different from one another. Further, in the vicinity of and on the y-axis negative side from the above focus detection cells, tracking detection cells S1b, S1c, S1d, S1e, S2b, S2c, S2d, and S2e, each having a square shape, are located. The tracking detection cells are used in the case where the first optical disc is used. Further, on the x-axis positive and negative sides from the focus detection cells, off-track compensation detection cells S1a and S2a are located. The off-track compensation detection cells are used in the case where the second optical disc is used. The focus detection cells, the tracking detection cells, and the off-track compensation detection cells are located so as to be symmetric about the y-axis, respectively.

Further, a region on the y-axis negative side on the detection surface 9a, tracking detection cells 3T1, 3T2, 3T3, and 3T4, each having a square shape, are located so as to be symmetric about the y-axis.

Hereinafter, relation between light entering the respective regions on the hologram surface 2a shown in FIG. 6 and light spots on the detection surface 9a will be described.

In the case where the first laser beam is used, the laser beam, which is from the optical disc 6a and is entering each of the quadrants on the hologram surface 2a, is diffracted and converged as follows (see FIG. 7).

<First Quadrant (First Laser Beam)>

The first-order diffracted beam, which is diffracted by the regions 21a, 21b, and 21c in the first quadrant, forms beam spots 31aB, 31bB, and 31cB on the detection cells S1b, S2e, and S1c, respectively. Further, the minus first-order diffracted beam, which is diffracted by the regions 21a, 21b, and 21c, forms beam spots 31aF, 31bF, and 31cF, respectively, on the detection cell 3T1.

<Second Quadrant (First Laser Beam)>

The first-order diffracted beam, which is diffracted by the regions 22a, 22b, and 22c on the second quadrant, forms beam spots 32aB, 32bB, and 32cB, on the detection cell S2b, S1e, and S2c, respectively. Further, the minus first-order diffracted beam, which is diffracted by the regions 22a, 22b, and 22c, forms beam spots 32aF, 32bF, and 32cF, respectively, on the detection cell 3T2.

<Third Quadrant (First Laser Beam)>

The first-order diffracted beam, which is diffracted by the third quadrant regions 23a, forms a beam spot 33aB on a position outside the detection cells, and the first-order diffracted beam, which is diffracted by the regions 23b and 23c, forms beam spots 32bB and 33bB on a boundary between the detection cells F2a and F1b. Further, the minus first-order diffracted beam, which is diffracted by the regions 23a, 23b, and 23c, forms beam spots 33aF, 33bF, and 33cF, respectively, on the detection cell 3T3.

<Fourth Quadrant (First Laser Beam)>

The first-order diffracted beam, which is diffracted by the regions 24a on the fourth quadrant, forms a beam spot 34aB on a position outside the detection cells, and the first-order diffracted beam, which is diffracted by the regions 24b and 24c, forms beam spots 34bB and 34cB on a boundary between the detection cells F2c and F1d. Further, the minus first-order diffracted beam, which is diffracted by the regions 24a, 24b, and 24c, forms beam spots 34aF, 34bF, and 34cF, respectively, on the detection cell 3T4.

Next, in the case where the second laser beam is used, the light, which is from the optical disc 6a' and is entering the respective quadrants on the hologram surface 2a, is diffracted and converged as follows (see FIG. 8).

<First Quadrant (Second Laser Beam)>

The first-order diffracted beam, which is diffracted by the regions 21a on the first quadrant, forms a beam spot 41aB on the detection cell S1a, and the first-order diffracted beam, which is diffracted by the regions 21b and 21c, forms beam spots 41bB and 41cB on positions outside the detection cells. The minus first-order diffracted beam, which is diffracted by the regions 21a, 21b, and 21c, forms beam spots 41aF, 41bF, and 41cF, respectively, on the detection cell 3T1.

<Second Quadrant (Second Laser Beam)>

The first-order diffracted beam, which is diffracted by the region 22a on the second quadrant, forms a beam spot 42aB on the detection cell S2a, and the first-order diffracted beam, which is diffracted by the regions 22b and 22c, forms beam spots 42bB and 42cB on positions outside the detection cells. Further, the minus first-order diffracted beam, which is diffracted by the regions 22a, 22b, and 22c, forms beam spots 42aF, 42bF, and 42cF, respectively, on the detection cell 3T2.

<Third Quadrant (Second Laser Beam)>

The first-order diffracted beam, which is diffracted by the region 23a on the third quadrant, forms a beam spot 43aB on the detection cell S2a, and the first-order diffracted beam, which is diffracted by the regions 23b and 23c, forms beam spots 43bB and 43cB on a boundary between the detection cell F2a and F1b. Further, the minus first-order diffracted beam, which is diffracted by the regions 23a, 23b, and 23c, forms beam spots 43aF, 43bF, and 43cF, respectively, on the detection cell 3T3.

<Fourth Quadrant (Second Laser Beam)>

The first-order diffracted beam, which is diffracted by the region 24a on the fourth quadrant, forms a beam spot 44aB on the detection cell S1a, and the first-order diffracted beam, which is diffracted by the regions 24b and 24c, forms beam spots 44bB and 44cB on a boundary between the detection cells F2c and F1d. Further, the minus first-order diffracted beam, which is diffracted by the regions 24a, 24b, and 24c, forms beam spots 44aF, 44bF, and 44cF, respectively, on the detection cell 3T4.

Next, a focus error detection method and a tracking error detection method will be described.

A diffraction pattern on the hologram surface 2a is formed such that a convergence point of the first-order diffracted beam is positioned inside a substrate of the photo detector 9, and that a convergence point of the minus first-order diffracted beam is positioned at a position on the optical disc side from the detection surface 9a. When the objective lens is shifted toward a direction parallel to the optical axis to change a working distance of the objective lens, the convergence point of each of the first-order diffracted beam and the minus first-order diffracted beam is also shifted toward a direction parallel to the optical axis, and thus, the size of each beam spot formed on the detection surface 9a changes. Therefore, in accordance with the size of each beam spot formed on the detection surface 9a, it is possible to detect a focus signal (so called a spot-size method).

Some of the above-described detection cells are electrically connected to one another to obtain the following eight signals.

F1=signal obtained in detection cell F1a+signal obtained in detection cell F1b+signal obtained in detection cell F1c+ signal obtained in detection cell F1d F2=signal obtained in detection cell F2a+signal obtained in detection cell F2b+signal obtained in the detection cell F2c+signal obtained in the detection cell F2d T1=signal obtained in detection cell 3T1
T2=signal obtained in detection cell 3T2
T3=signal obtained in detection cell 3T3
T4=signal obtained in detection cell 3T4

S1=signal obtained in detection cell S1a+signal obtained in detection cell S1b+signal obtained in detection cell S1c+ signal obtained in detection cell S1d+signal obtained in detection cell S1e S2=signal obtained in detection cell S2a+signal obtained in detection cell S2b+signal obtained in detection cell S2c+ signal obtained in detection cell S2d+signal obtained in detection cell S2e Calculation means (not shown) provided on the photo detector 9 performs calculations of the following formulas (1) to (4) with the use of each of the detected signals F1, F2, T1, T2, T3, T4, S1, and S2 so as to obtain a focus error signal FE, a signal TE1, a signal TE2, and a reproduction signal RF on the optical disc signal surface.

$$FE = F1 - F2 \quad (1)$$

$$TE1 = S1 - S2 \quad (2)$$

$$TE2 = (T2 + T3) - (T1 + T4) \quad (3)$$

$$RF = T1 + T2 + T3 + T4 \quad (4)$$

Further, a tracking error signal TE for tracking control is obtained in accordance with the following formulas (5) and (6).

$$TE = TE1 \quad (5)$$

(In the Case of Using the First Laser Beam)

$$TE = TE2 - \alpha \times TE1 \quad (6)$$

(In the case of using the second laser beam, wherein α is a constant)

FIGS. 9A and 9B are schematic diagrams showing changes in offset amounts of signals TE1 and TE2 in the case where the objective lens 5 and a polarization hologram substrate 2 are decentered in the radial direction of the optical disc 6' and in the case where the second laser beam is used. FIG. 9A indicates the signal TE2 represented by the above formula (3), and FIG. 9B indicates the signal TE1 represented by the above formula (2). The horizontal axis indicates an amount of decentering of each of the objective lens 5 and the polarization hologram substrate 2 in the radial direction, where the optical axis is set as the reference. The vertical axis indicates an offset amount included in each of the signals.

Generally, light intensity is strong on and in the vicinity of the optical axis, and decreases in a portion of the light which is increasingly distant from the optical axis. That is, since the light intensity distributes unevenly, the signals TE2 and TE1 are offset due to decentering of the objective lens 5 (i.e., decentering relative to the light intensity distribution). Therefore, in the case where the second laser beam is used, the offset included in the signal TE2 needs to be electrically compensated with the use of the signal TE1. Specifically, in accordance with formula (6), the signal TE1 amplified by an appropriate weight (constant α) is subtracted from the signal TE2, whereby the offset of the tracking error signal TE, which is caused by the decentering of the objective lens 5 and the polarization hologram substrate 2, can be cancelled. The tracking error signal TE is generated in this manner, whereby it is possible to prevent off-track from being caused by a change in the offset amount at the time of tracking control.

The above-described uneven light intensity distribution also occurs in a similar manner in the case where the first laser beam is used. More specifically, due to decentering of the objective lens 5 and the polarization hologram substrate 2, the light distribution on the regions 21a, 21b, and 21c (the first quadrant on the hologram surface 2a) and the light distribution on the regions 22a, 22b, and 22c (the second quadrant on the hologram surface 2a) become asymmetric. As indicated by the above formula (5) (formula (2)) and FIG. 7, in the case where the first laser beam is used, the tracking error signal TE is generated based on the intensity of the first-order diffracted beam diffracted by the first quadrant and the second quadrant on the hologram surface 2a, and thus the asymmetry between the light distribution in the first quadrant and that in the second quadrant leads to deterioration in the tracking error signal TE.

In the optical pickup device 12 according to this example, in the case of using the first laser beam, electrical connection between tracking detection cells are made elaborately, instead of using an offset compensation signal, whereby the offset is compensated. Specifically, the spot 31bB generated by the region 21b in the first quadrant and the spot 32bB generated by the region 22b on the second quadrant are interchanged with each other, and a difference signal is generated. As a result, asymmetry of the light intensity distribution is cancelled in accordance with a calculation based on formula (2), and offset of the tracking error signal TE is reduced.

The optical pickup device 12 as above described is compatible with optical discs of two standards, and is capable of performing tracking control without causing off-track even in the case where the objective lens 5 and the polarization hologram substrate 2 are decentered in the radial direction of a disc.

[Patent document 1] International Publication 2007/072683 Pamphlet

DISCLOSURE OF THE INVENTION

Problems to be Solved by the Invention

However, the above-described optical pickup device has the following problems.

When the second laser beam is used, the offset of the signal TE2 is compensated with the signal TE1. The signal TE1 is generated based on light (the zeroth-order diffracted beam from the optical disc 6') entering the regions 21a, 22a, 23a, and 24a on the hologram surface 2a. Therefore, the sensitivity of the offset compensation signal TE1 depends on the intensity of the light entering the regions 21a, 22a, 23a, and 24a.

FIG. 10A shows intensity distribution of light entering the hologram surface 2a, under a condition where there is no decentering or the like of the optical disc, and where a center L of a light intensity distribution FF substantially corresponds to an optical axis of the objective lens 5. In FIG. 10A, the intensity of the light entering the regions 21a and 24a is represented by an area SS1, and the intensity of the light entering the regions 22a and 23b is represented by an area SS2. In this case, the areas SS1 and SS2 are equal to each other, and thus the signal TE1 obtained based on formula (2) comes to zero.

On the other hand, FIG. 10B shows intensity distribution of light entering the hologram surface 2a, under a condition where the objective lens 5 and the polarization hologram element 2 are shifted in an integrated manner due to decentering or the like of the optical disc, and where the center L of the intensity distribution FF of the light is displaced relative to the optical axis of the objective lens 5. In FIG. 10B, the intensity of the light entering the regions 21a and 24a is represented by an area SS1', and the intensity of the light entering the regions 22a and 23b is represented by an area SS2'. In this case, the areas SS1' and SS2' are not equal to each other, and the difference between the areas is detected as the signal TE1, based on formula (2).

As is understandable from FIGS. 10A and 10B, the regions 21a, 22a, 23a, and 24a are close to the center L of the light intensity distribution, the intensity distribution of the entering light shows moderate variation. Therefore, even if positions of the objective lens 5 and the polarization hologram element 2 are shifted, imbalanced light intensity, i.e., the difference between the area SS1' and the area SS2' is relatively small.

In order to detect a change in the light intensity distribution as accurate as possible, and in order to improve the sensitivity of the compensation signal TE1, it is preferable to enlarge the regions 21a, 22a, 23a, and 24a in the left-right direction (i.e., radial direction of the tracks) shown in FIGS. 10A and 10B to increase a degree of change in the light intensity.

However, under a condition where the width of each region is simply increased, when a relative position between the objective lens 5 and the polarization hologram 2 is displaced even slightly, a problem is caused in which a first-order diffracted beam from the optical disc leaks into the regions 21a, 22a, 23a, and 24a which are for receiving the zeroth-order diffracted beam only.

Further, when the first-order diffracted beam from the optical disc leaks into the regions 21a, 22a, 23a, and 24a, the following problem will be also caused.

FIG. 11(a) shows a waveform of the signal TE2 represented by formula (3). FIG. 11(b) shows a waveform of the compensation signal TE1 which is represented by formula (2). FIG. 11(c) shows a waveform of the tracking error signal TE after offset compensation, represented by formula (5).

A waveform of a sine wave included in the signal TE2 shown in FIG. 11(a) represents a groove crossing waveform (so called an AC component) that results from the imbalanced intensity of the plus and minus first-order diffracted beams, the imbalance being caused by displacement of a relative position between the convergence spot on a signal surface of the optical disc and grooves of the tracks. Difference Q2 between the center of the sine wave and a line, where the level of the signal TE2 is zero, is the offset of the signal TE2, i.e., the offset (so-called a DC component) caused by the imbalanced zeroth-order diffracted beam.

The compensation signal TE1 has a waveform shown in FIG. 11(b). The signal TE1 is originally generated based on the zeroth-order diffracted beam from the optical disc, and thus even if the intensity of the plus and minus first-order diffracted beams is imbalanced due to displacement of the relative position between the convergence spot on the optical disc and the grooves on the signal surface, the signal TE1 is not affected by the imbalance. Accordingly, the so-called groove crossing waveform is not generated. However, when the width of each of the regions 21a, 22a, 23a, and 24a shown in FIG. 6 is increased, and the relative position between the objective lens 5 and the polarization hologram element 2 is displaced even slightly, a component of the plus and minus first-order diffracted beams leaks into the regions 21a, 22a, 23a, and 24a. As a result, the signal TE1 shows a sine waveform. Difference Q1 between the center of the sine wave and the line, where the level of the signal TE1 is zero, is the offset (DC component) caused by the imbalanced zeroth-order diffracted beam, and it is a value of this DC component that is essentially necessary to compensate the signal TE2.

As shown in FIGS. 11(a) and (b), the groove crossing component (AC component) included in the compensation signal TE1 is caused by brightness imbalance of the plus and minus first-order diffracted beams, and thus a phase of the AC component of the signal TE1 is in phase with a phase of the AC component of the signal TE2. Therefore, when a calculation for compensating the offset component of the signal TE2 is performed in accordance with above-described formula (6), not only the DC component, but also a part of the AC component is offset, which leads to reduction in amplitude of the tracking error signal TE (FIG. 11(c)). In other words, in the above optical pickup device 12, when the width of each of the regions 21a, 22a, 23a, and 24a is increased, the offset of the tracking error signal TE is compensated. However, since a modulation degree of the tracking error signal TE is lowered, a problem is caused in that the tracking control tends to be unstable.

Therefore, an object of the present invention is to provide an optical pickup device and an optical disc device using the same which are capable of preventing lowering of the modulation degree of the tracking error signal, and also capable of stabilizing the tracking control.

Solution to the Problems

The present invention is directed to an optical pickup device performing at least one of reading, writing, and erasing of information on an optical recording medium. The optical pickup device includes: a light source for emitting a light beam having a first wavelength and a light beam having a second wavelength that is different from the first wavelength; an objective lens system for converging, on a track of the optical recording medium, a light beam emitted from the light source; a light branching section including a first region having a central axis of the objective lens system passing therethrough and a pair of second regions which are in contact with boundaries of the first region, for receiving a zeroth-order diffracted beam from the optical recording medium in the first region, and for receiving the zeroth-order diffracted beam and plus and minus first-order diffracted beams from the optical recording medium in the second region when the light beam having the second wavelength is used, and for splitting the light beam having entered the first region and the second regions into a plurality of light beams; an optical element which is disposed between the objective lens system and the optical branching section, and covers a portion of the first region, the portion extending along the boundaries between the first region and the second regions; a detection section for generating a first electrical signal based on intensity of the light beams split by the first region, and for generating a second electrical signal based on intensity of the light beams split by the first region and the second regions, when the light beam having the second wavelength is used; and a calculation section for electrically compensating an offset component included in the second electrical signal by using the first electrical signal when the light beam having the second wavelength is used, and for generating a tracking error signal for tracking control. The optical element causes the light beam having the first wavelength to be transmitted therethrough, and causes the light beam having the second wavelength to be partially transmitted therethrough.

The optical element preferably emits the light beams received from the objective lens system while shifting phases of the light beams.

In this case, a phase difference between a phase of a wave surface of a light beam transmitted through the optical element and a phase of a wave surface of a light beam transmitted through a portion where the optical element is not located is preferably equal to or greater than (k$\pi$–¼$\pi$) and equal to or less than (k$\pi$+¼$\pi$), wherein k represents an odd number.

Further, transmittance property of the optical element with respect to the light beam having the second wavelength is preferably equal to or greater than 10% and equal to or less than 50%.

Further, an optical disc device according to the present invention is equipped with the optical pickup device including the above-described features.

EFFECT OF THE INVENTION

According to the present invention, even if positional displacement between an objective lens system and a light branching section is caused by an assembly error or the like, it is possible to prevent lowering of the modulation degree of the tracking error signal, and also possible to stabilize the tracking control.

Figures 1A, 1B:
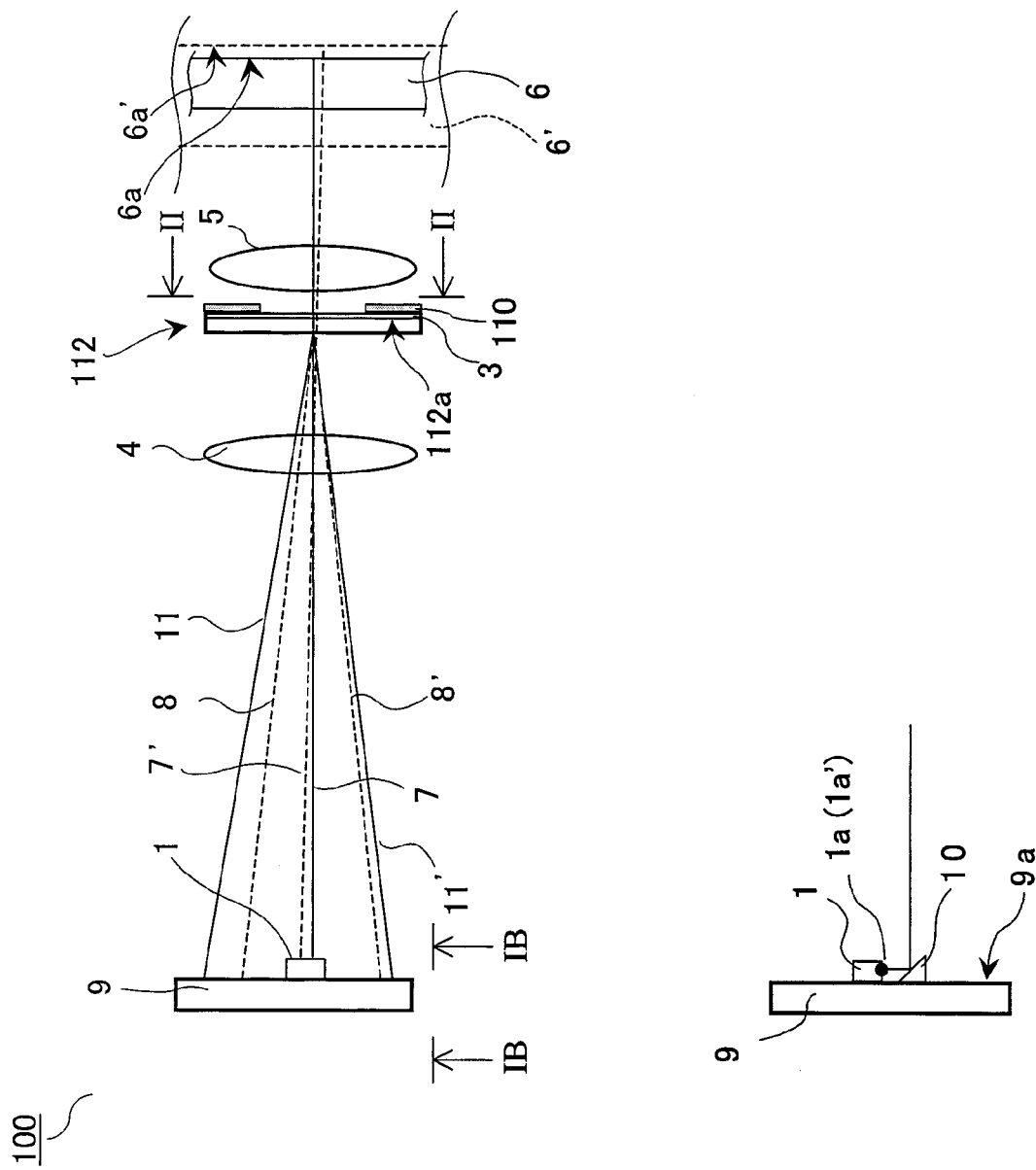
FIG. 1A is a side view showing a schematic configuration of an optical pickup device according to an embodiment of the present invention.
FIG. 1B is a diagram showing a light source portion shown in FIG. 1A, as viewed from an IB-IB line.

DESCRIPTION OF THE REFERENCE CHARACTERS 1 light source
1a, 1a' light emitting point
3 ¼ wavelength plate
4 collimating lens
5 objective lens
6, 6' optical disc
6a, 6a' signal surface
7, 7' optical axis
8, 11 first-order diffracted beam
8', 11' minus first-order diffracted beam
9 photo detector
9a detection surface
10 reflecting mirror
100 optical pickup device
110 partial light shielding element
112 polarization hologram element
112a hologram surface

BEST MODE FOR CARRYING OUT THE INVENTION

FIG. 1A is a side view showing a schematic configuration of an optical pickup device according to an embodiment of the present invention, and FIG. 1B is a diagram showing a light source portion shown in FIG. 1A, as viewed from an IB-IB line.

The optical pickup device 100 is used for an optical disc device compatible with a first optical disc 6 (e.g., a DVD) and a second optical disc 6' (e.g., a CD), which comply with different standards from each other, and is designed to perform reading, writing, and/or erasing of information on the first optical disc 6 and the second optical disc 6' by using light beams having wavelengths adaptable to the respective standards.

An optical pickup device 100 according to the present embodiment includes a photo detector 9, a laser light source 1, a reflecting mirror 10, a collimating lens 4, a polarization hologram element 112, a ¼ wavelength plate 3, a partial light shielding element 110, and an objective lens 5.

The laser light source 1 is arranged on a detection surface 9a of the photo detector 9, and emits a first laser beam having a first wavelength $\lambda 1$ suitable for the first optical disc 6, and a second laser beam having a second wavelength $\lambda 2$ suitable for the second optical disc 6' (wherein $\lambda 2 > \lambda 1$). The first laser beam is emitted from a light emitting point 1a, whereas the second laser beam is emitted from a light emitting point 1a'.

The reflecting mirror 10 is fixed onto the detection surface 9a of the photo detector 9, and reflects the light emitted from the laser light source 1 toward a direction substantially perpendicular to the detection surface 9a.

The collimating lens 4 is arranged on an optical path of the light reflected by the reflecting mirror 10, and converts diffusion light emitted from the laser light source 1 into substantially parallel light.

The polarization hologram element 112 has a hologram surface 112a on a side where the optical disc 6 or 6' are arranged, and diffracts light returned from the optical disc 6 or 6', whereby the returned light is split into several light beams. The hologram surface 112a according to the present embodiment will be described later in detail.

The ¼ wavelength plate 3 converts linearly polarized light (S-wave or P-wave) transmitted through the polarization hologram element 112 into circularly polarized light. The ¼ wavelength plate 3 also converts the circularly polarized light returned from the objective lens 5 into the linearly polarized light (P-wave or S-wave).

The partial light shielding element 110 is provided between the objective lens 5 and the polarization hologram element 112, and is an optical element that covers a portion of the hologram surface 112a. The partial light shielding element allows the first laser beam having the first wavelength λ1 to be transmitted therethrough completely, but allows the second laser beam having the second wavelength λ2 to be transmitted therethrough partially. In addition, the partial light shielding element 110 according to the present embodiment emits light from the objective lens 5 while shifting a phase of the light by a predetermined amount. The partial light shielding element 110 will be described later in detail.

The objective lens 5 converges entering light and forms a spot on a track of the optical disc 6 or 6'. The objective lens 5 may be composed of at least one lens element, and the number of the lens elements is not particularly limited.

In the present embodiment, the polarization hologram element 112, the ¼ wavelength plate 3, and the partial light shielding element 110 are formed in an integrated manner. Further, the polarization hologram element 112 (¼ wavelength plate 3, and the partial light shielding element 110) is fixed with respect to the objective lens 5, and is freely movable in the radial direction of the optical disc 6 or 6' in an integrated manner with the objective lens.

The photo detector 9 is an element for detecting respective light beams split by the hologram surface 112a. The photo detector 9 includes a plurality of detection cells arranged on the detection surface 9a, and generates respective signals represented by above formulas (1) to (4). The photo detector 9 also includes a calculation section (not shown) that performs calculations based on the above formula (5) and (6), and generates a tracking error signal TE for tracking control. Particularly, in the case of using the second laser beam, as indicated by formula (6), the calculation section electrically compensates an offset (DC component) included in the second signal TE2 represented by formula (3) with the use of the first signal TE1 represented by formula (2).

Figure 7:
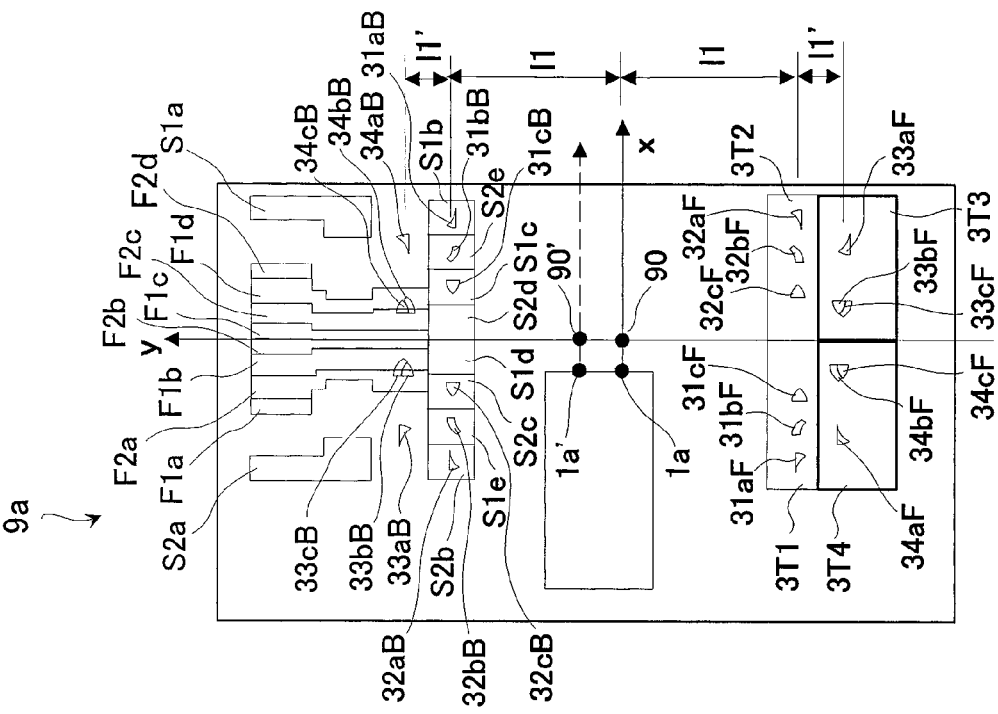
FIG. 7 is a diagram showing a detection pattern and a detected light distribution on a photo detector shown in FIG. 5A (when a first laser beam is used).
Figure 8:
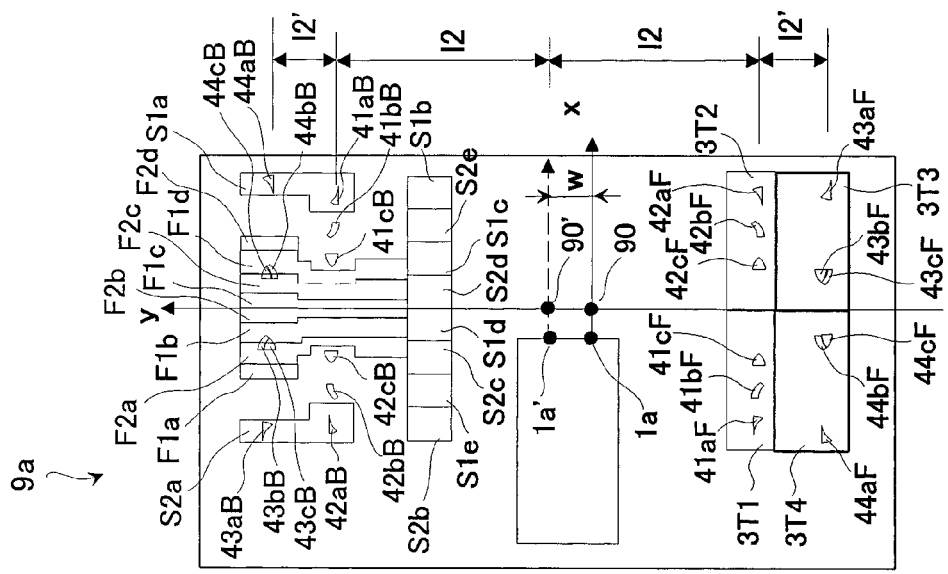
FIG. 8 is a diagram showing a detection patter and a detected light distribution on the photo detector shown in FIG. 5A (when a second laser beam is used).
Figure 9A:
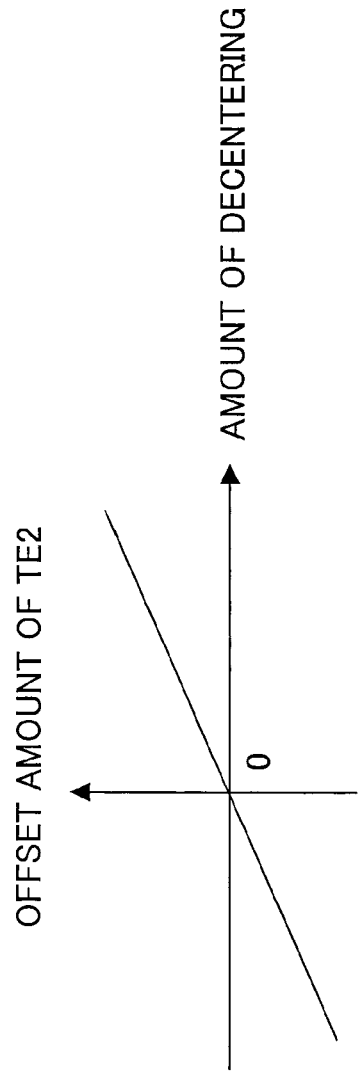
FIG. 9A is a schematic diagram showing a change in an offset amount of the signal TE2 when the objective lens and a polarization hologram substrate are decentered in a radial direction of the optical disc under a condition where the second laser beam is used.
Figure 9B:
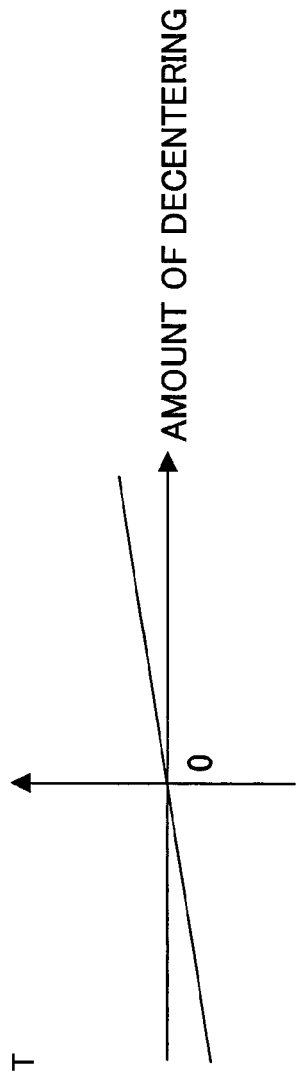
FIG. 9B is a schematic diagram showing a change in an offset amount of the signal TE1 when the objective lens and the polarization hologram substrate is decentered in the radial direction of the optical disc under a condition where the second laser beam is used.
Figure 10A:
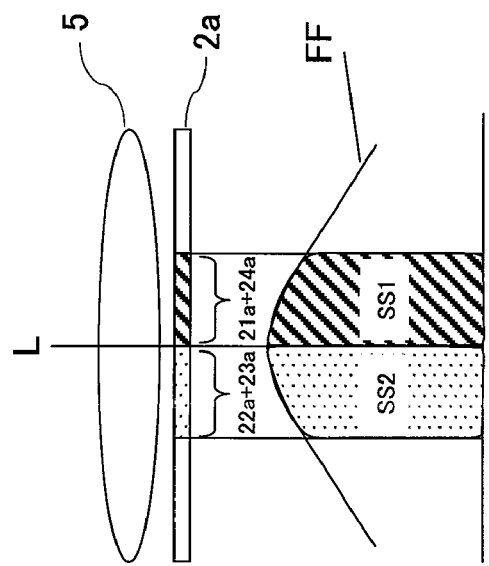
FIG. 10A is a diagram showing intensity distribution of light entering the hologram surface under a condition where the center of the intensity distribution of the light substantially corresponds to an optical axis of the objective lens.
Figure 10B:
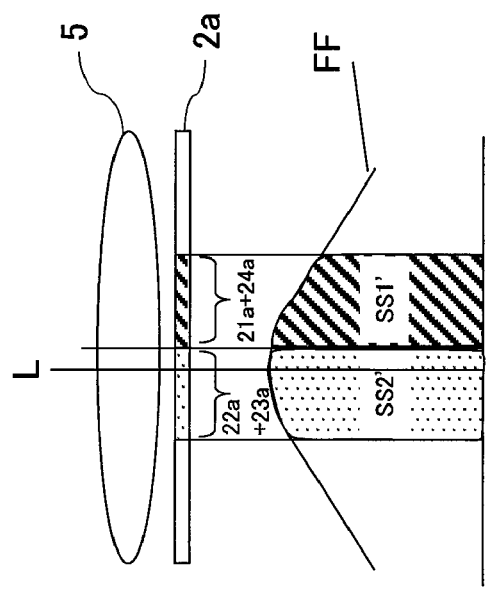
FIG. 10B is a diagram showing the intensity distribution of the light entering the hologram surface under a condition where the center of the intensity distribution of the light and the optical axis of the objective lens are displaced from each other.
Figure 11:
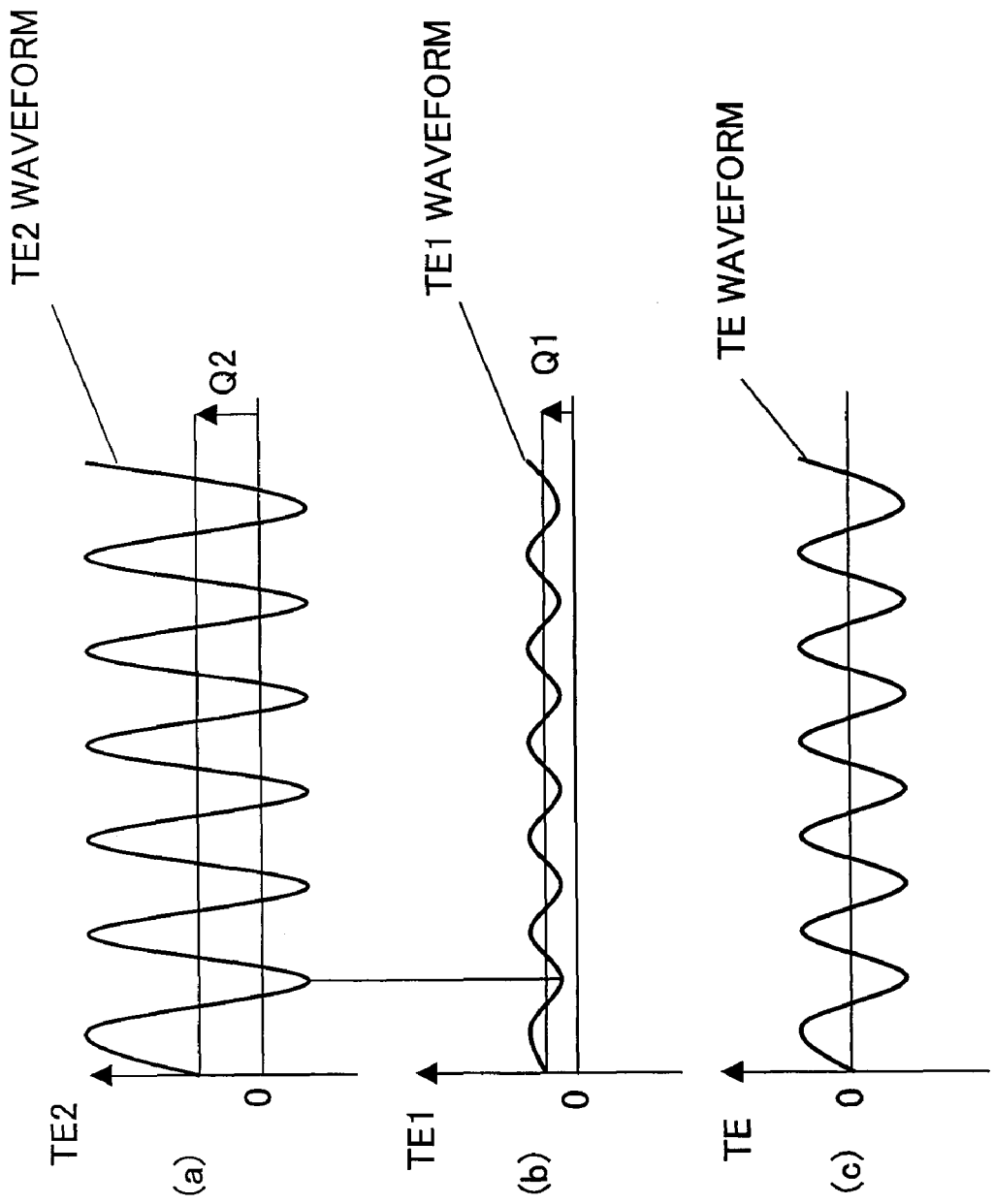
FIG. 11 is a diagram showing waveforms of the signal TE2 represented by formula (3), the compensation signal TE1 represented by formula (2), and the tracking error signal TE, which is offset-compensated, represented by formula (5).

A specific configuration and function of the photo detector 9 according to the present invention are the same as those described with reference to FIGS. 7 and 8, and thus description of the configuration and function will be omitted.

In the case of using the first optical disc 6, the laser light source 1 emits the first laser beam (wavelength λ1) from the light emitting point 1a. The emitted first laser beam is reflected by the reflecting mirror 10, and converted into the substantially parallel light by the collimating lens 4. The parallel light emitted from the collimating lens 4 is transmitted through the polarization hologram element 112, and is converted into circularly polarized light by the ¼ wavelength plate 3. Thereafter, the circularly polarized light is converged by the objective lens 5, to form a spot on the signal surface 6a of the first optical disc 6. The light reflected by the signal surface 6a is transmitted through the objective lens 5, and is converted back into the linearly polarized light (P-wave or S-wave) by the ¼ wavelength plate 3. Thereafter, the linearly polarized light enters the hologram surface 112a of the polarization hologram element 112. The light having entered the polarization hologram element 112 is diffracted by the hologram surface 112a, and is split into a first-order diffracted beam 8 and a minus first-order diffracted beam 8' which are symmetric about the optical axis 7 of the first laser beam. Thereafter, the split diffracted beams are transmitted through the collimating lens 4 and enter the detection surface 9a of the photo detector 9.

On the other hand, in the case of using the second optical disc 6', the laser light source 1 emits the second laser beam (wavelength λ2) from the light emitting point 1a'. The emitted second laser beam is reflected by the reflecting mirror 10, and is converted into the substantially parallel light by the collimating lens 4. The parallel light emitted from the collimating lens 4 is transmitted through the polarization hologram element 112, and is converted into the circularly polarized light by the ¼ wavelength plate 3. Thereafter, the circularly polarized light is converged by the objective lens 5, and a converged light spot is formed on the signal surface 6a' of the second optical disc 6'. The light reflected by the signal surface 6a' is transmitted through the objective lens 5, and is converted back into the linearly polarized light (P-wave or S-wave) by the ¼ wavelength plate 3. Thereafter, the linearly polarized light enters the hologram surface 112a of the polarization hologram element 112. The light having entered the polarization hologram element 112 is diffracted by the hologram surface 112a, and is split into a first-order diffracted beam 11 and a minus first-order diffracted beam 11' which are symmetric about the optical axis 7' of the second laser beam. Thereafter, the split diffracted beams are transmitted through the collimating lens 4 and enter the detection surface 9a of the photo detector 9.

The hologram surface 112a and the partial light shielding element 110 according to the present embodiment will be described in detail, hereinafter.

Figure 2A:
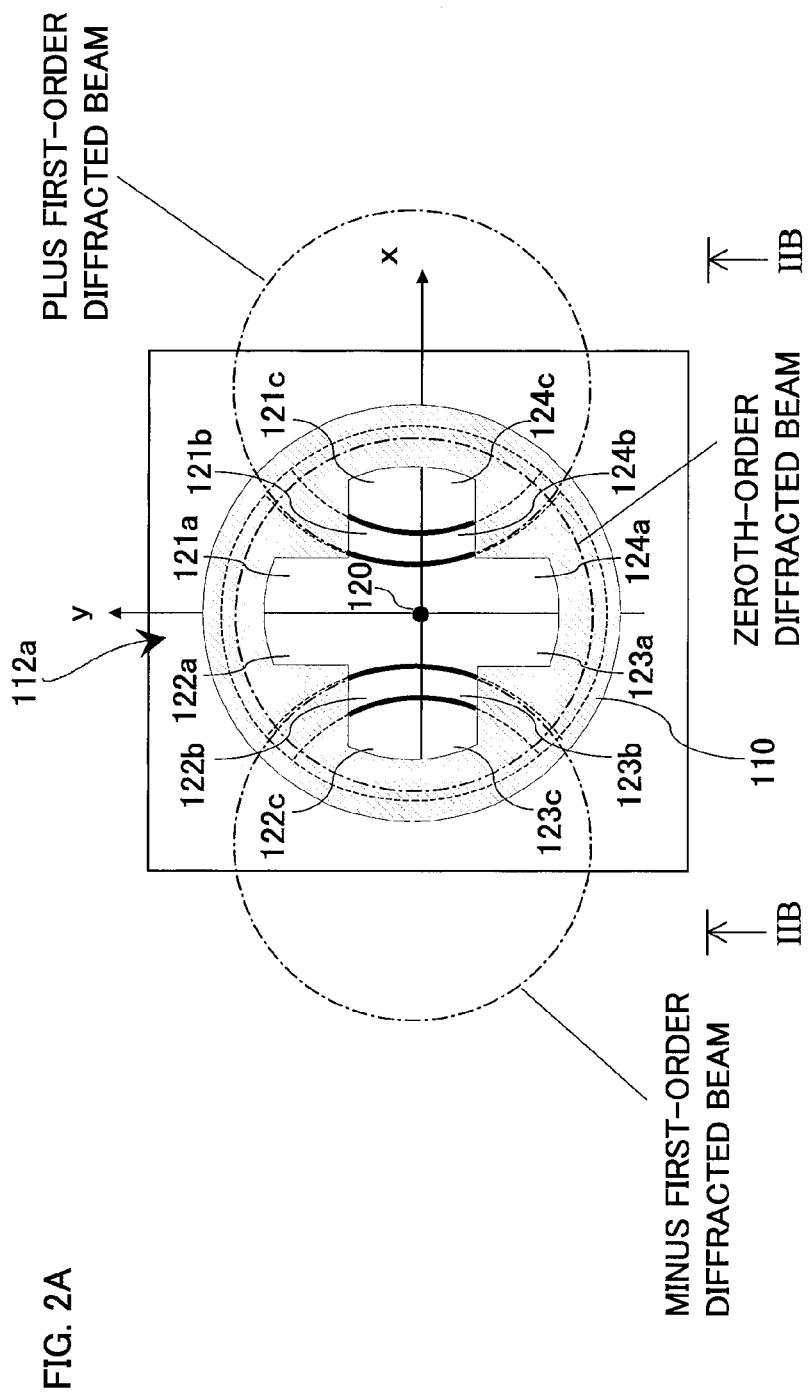
FIG. 2A is a diagram showing a schematic configuration of a partial light shielding element and a hologram surface shown in FIG. 1, as viewed from a II-II line.
Figure 2B:
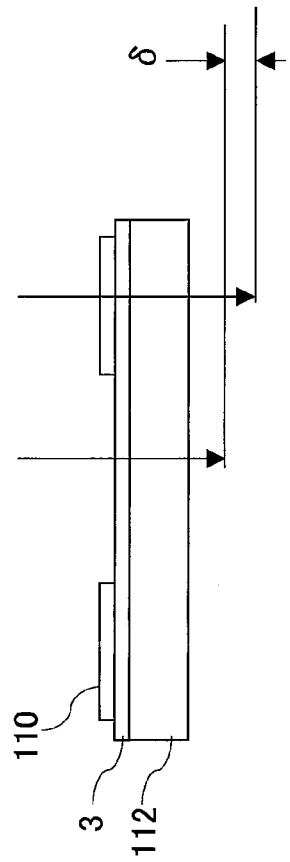
FIG. 2B is a diagram viewed from an IIB-IIB of FIG. 2A.

FIG. 2A is a diagram showing a schematic configuration of the partial light shielding element 110 and the hologram surface 112a shown in FIG. 1, as viewed from an II-II line. FIG. 2B is a diagram viewed from an IIB-IIB line of FIG. 2A. In FIG. 2A, positions where the zeroth-order diffracted beam and the plus and minus first-order diffracted beams from the second optical disc 6' enter on the hologram surface 112a, in the case of using the second laser beam, are indicated by chain lines.

Hereinafter, for convenience of explanation, an intersection between the hologram surface 112a and the optical axis of the laser beam is defined as a point 120, two straight lines perpendicular to each other at the point 120 are defined as an x-axis and a y-axis, whereby positions on the hologram surface 112a are indicated with the use of respective quadrants on an x-y coordinate system.

On the hologram surface 112a, a diffraction region of a circular shape is formed, and the diffraction region is divided into four regions so as to correspond to first to fourth quadrants, respectively. Further, a region in each quadrant is divided into three regions, and eventually, regions 121a to 121c (first quadrant), regions 122a to 122c (second quadrant), regions 123a to 123c (third quadrant), and regions 124a to 124c (fourth quadrant) are formed.

The zeroth-order diffracted beam and the plus and minus first-order diffracted beams, which are diffracted by the optical disc, enter the hologram surface 112a. Regions, where the zeroth-order diffracted beam and the plus and minus first-order diffracted beams enter, vary depending on the cases where the first laser beam is used and where the second laser beam is used.

In the case of using the first laser beam (first optical disc 6), the regions 121a, 122a, 123a, 124a, 121b, 122b, 123b, and 124b receive only the zeroth-order diffracted beam, which is reflected due to a track shape on the signal surface 6a and is not subjected to diffraction, whereas the remaining regions 121c, 122c, 123c, and 124d receive the zeroth-order diffracted beam and the first-order diffracted beam (either the plus first-order diffracted beam or the minus first-order diffracted beam), which are emitted from the first optical disc 6.

On the other hand, in the case of using the second laser beam (second optical disc 6'), the regions 121a, 122a, 123a, and 124a basically receive only the zeroth-order diffracted beam, which is reflected due to a track shape on the signal surface 6a' and is not subjected to diffraction, whereas the remaining regions 121b, 122b, 123b, 124b, 121c, 122c, 123c, and 124c receive the zeroth-order diffracted beam and the first-order diffracted beams from the second optical disc 6'. In other words, in the case of using the second laser beam, the regions 121a, 122a, 123a, and 124a are regarded as a region (hereinafter referred to as a first region) receiving the zeroth-order diffracted beam, whereas the remaining regions 121b, 122b, 123b, 124b, 121c, 122c, 123c, and 124c are regarded as a region (hereinafter referred to as a second region) receiving both of the zeroth-order diffracted beam and the first-order diffracted beams.

Figure 6:
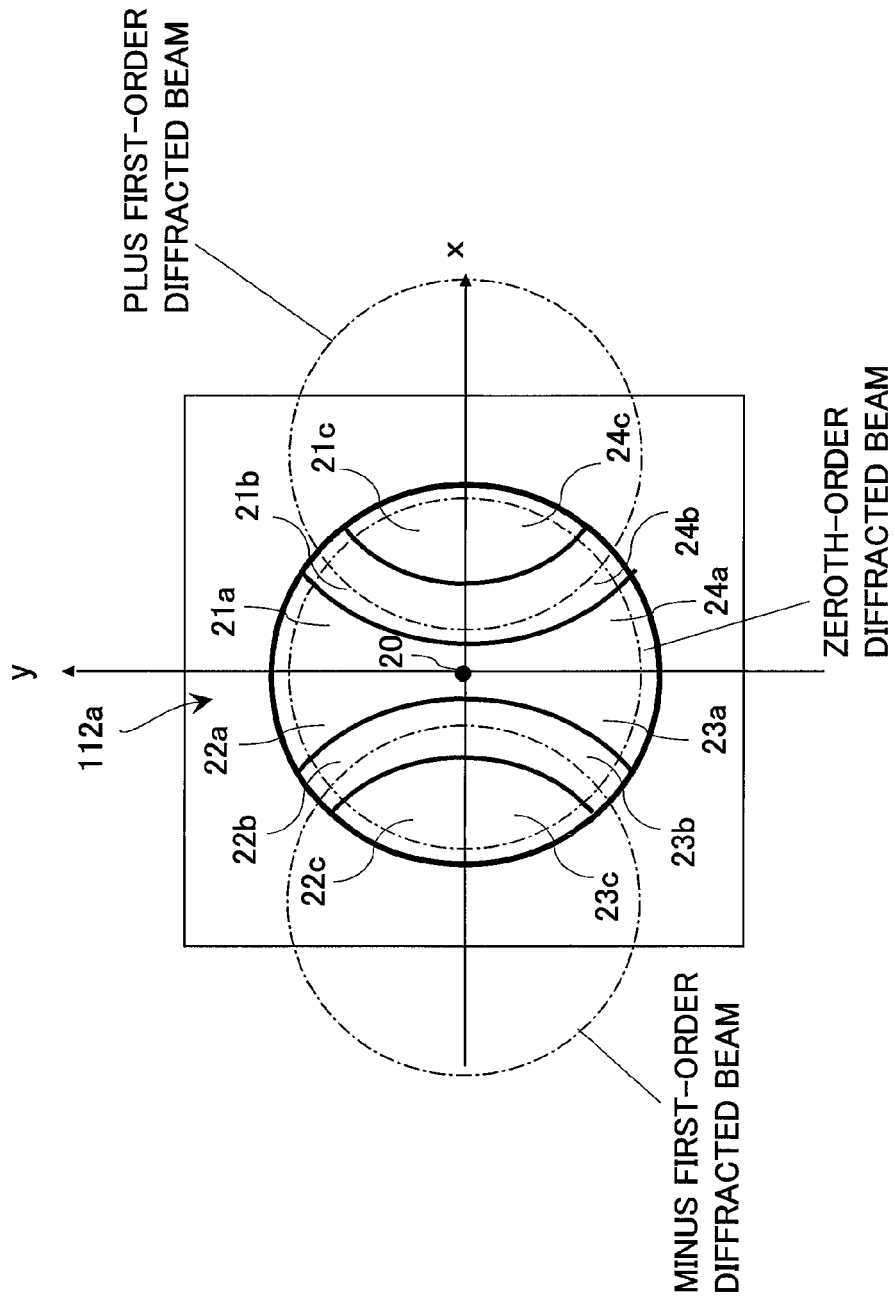
FIG. 6 is a diagram showing a schematic configuration of a hologram surface shown in FIG. 5A, as viewed from a VI-VI line.

Layout patterns of the respective regions are basically the same as those shown in FIG. 6. However, the regions 121b, 122b, 123b, and 124b are narrowed down compared to the regions 21b, 22b, 23b, and 24b shown in FIG. 6, whereby widths of the regions 121a, 122a, 123a, and 124a are increased in a direction along the x-axis. More specifically, respective boundaries between the regions 121a, 122a, 123a, and 124a and the regions 121b, 122b, 123b, and 124b substantially coincide with portions of outer perimeters of regions where the first-order diffracted beams enter in the case where there is no positional displacement between the objective lens 5 and the polarization hologram element 112.

The partial light shielding element 110 is formed by laminating a plurality of layers on a surface of the ¼ wavelength plate 3 provided on the hologram surface 112a of the light shielding hologram element 112. As shown in FIG. 2A, the partial light shielding element 110 has an opening of a cross-shape extending from the point 120, which corresponds to the center of the cross shape, in the x-axis direction and the y-axis direction, and the partial light shielding element 110 covers a portion of the circular shaped diffraction regions. More specifically, the partial light shielding element 110 is formed so as to cover a portion of the first region, the portion having a predetermined range extending from ends of the boundaries between the first region which receives the zeroth-order diffracted beam and the region which receives both of the zeroth-order diffracted beam and the first-order diffracted beam, in the case where the second laser beam is used.

The partial light shielding element 110 causes the first laser beam to be transmitted therethrough completely, and exerts a light shielding effect with respect to the second laser beam. In the present embodiment, the partial light shielding element 110 does not shield the second laser beam completely, but shields the second laser beam partially, that is, causes the second laser beam to be transmitted therethough partially.

The partial light shielding element 110 according to the present embodiment shifts a phase of entering light such that a phase difference δ is produced between a phase of the light transmitted through the opening and that of the light transmitted through the light shielding region. The phase difference δ is obtained based on the following formula (7).

$$\delta = (n_1-1)d_1 + (n_2-1)d_2 + \ldots + (n_i-1)d_i$$

wherein, $n_1, n_2, \ldots, n_i$: refractive indices of respective layers, and
$d_1, d_2, \ldots, d_i$: thickness of respective layers.

Here, a function of the partial light shielding element 110 will be described by presenting a case where a relative position between the objective lens 5 and the polarization hologram element 112a is displaced in a track direction (i.e., the y-axis direction shown in FIG. 2) due to a fixing error or the like at the time of manufacturing.

Figure 3:
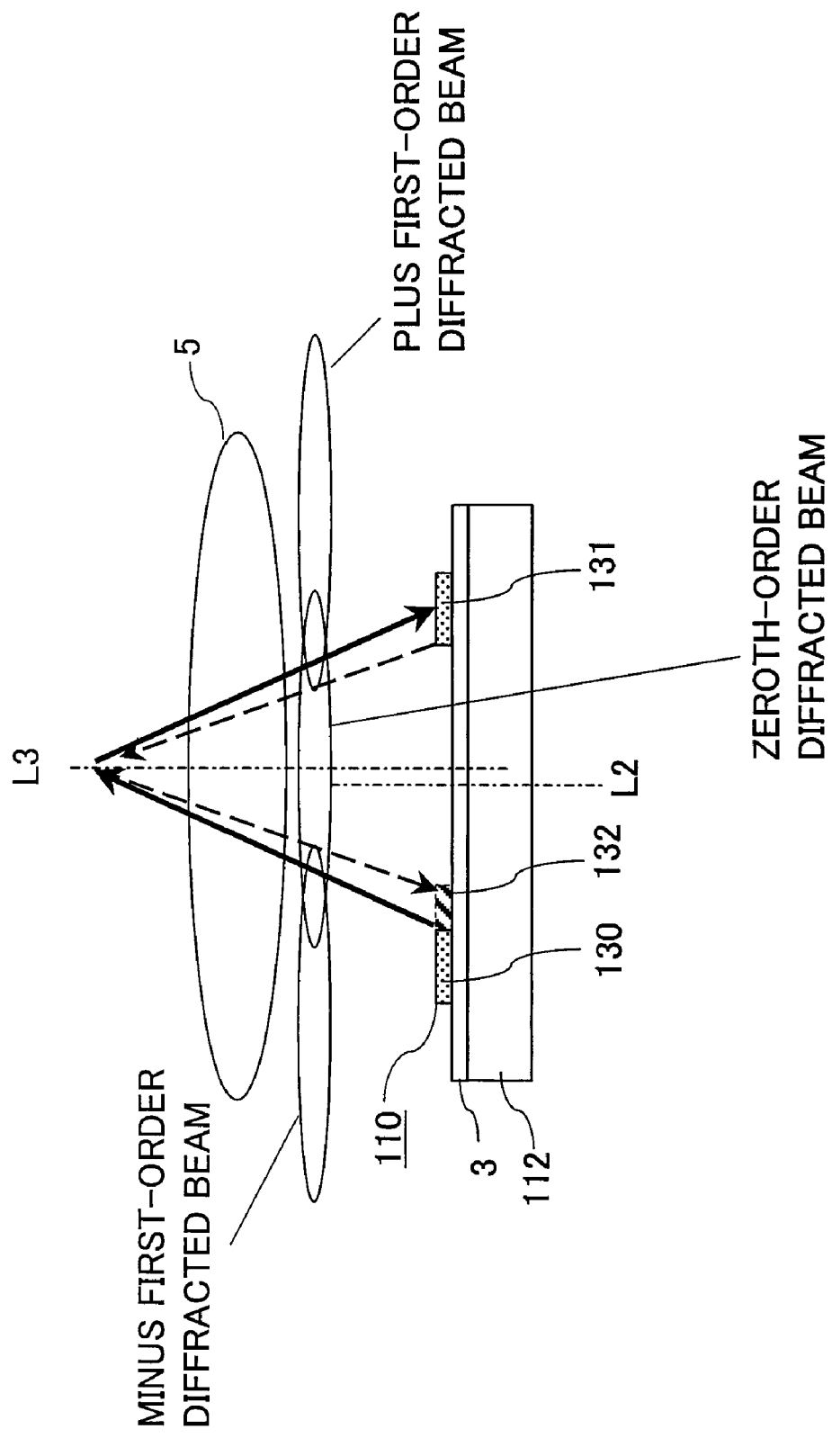
FIG. 3 is a schematic view showing a relation between a position of a polarization hologram element relative to an objective lens 5 and light entering the polarization hologram element.

FIG. 3 is a schematic view showing a relation between a position of the polarization hologram element 112a relative to the objective lens 5 and the light entering the polarization hologram element 112a.

For example, in the case where a central axis L2 of the polarization hologram element 112a is displaced with respect to a central axis L3 of the objective lens 5 toward the left direction in FIG. 3, the minus first-order diffracted beam will leak into the region which is located on the left side of the central axis L2 and which receives only the zeroth-order diffracted beam, when the partial light shielding element 110 is not provided. However, in the present embodiment, since the light having entered a position on the right side of the central axis L2 from the collimating lens is partially blocked by a portion 131 of the partial light shielding element 110, a shadow 132 of the partial light shielding element 110 appears at a position which is symmetric to the portion 131 about the central axis L2, and thus the minus first-order diffracted beam is prevented from leaking into the symmetric position (a dashed arrow in the drawing). On the left side of the central axis L2, the light, which has been transmitted through a position on the inner side of a portion 130 of the partial light shielding element 110, is blocked by the portion 131 of the partial light shielding element 110 at a position which is symmetric to the position where the light has been transmitted (a solid arrow in the drawing).

In this manner, even in the case where the positional relation between the objective lens 5 and the polarization hologram element 112 is displaced, light is partially blocked by the partial light shielding element 110 when transmitted and returned therethrough. As a result, when the regions 121a, 122a, 123a, and 124a which receive only the zeroth-order diffracted beam are enlarged so as to generate the compensation signal TE1, it is possible to reduce leaking of the first-order diffracted beams into the regions 121a, 122a, 123a, and 124a even if the position of the polarization hologram 112 relative to the objective lens 5 is displaced in the y-axis direction (FIG. 2A). When the leaking of the first-order diffracted beams into these regions is reduced, the AC component included in the offset compensation signal TE1 is reduced, and thus it is possible to prevent reduction in amplitude of the tracking error signal TE which is obtained by subtraction represented by formula (6).

When the partial light shielding element 110 is provided at the boundaries between the regions 121a, 122a, 123a, and 124a, and the regions 121b, 122b, 123b, and 124b, the opening is not circular shaped. In the present embodiment, the opening of the partial light shielding element 110 is formed so as to be line-symmetric about the x-axis and also about the y-axis. Further, the size of the opening in the x-axis direction and that in the y-axis direction are set to be sufficiently large with respect to the diameter of light flux transmitted therethrough. Since the partial light shielding element 110 has such a shape, it is possible to avoid such a convergence condition that adversely affects signal quality, such as deterioration in resolution and occurrence of cross-talk between tracks.

As above described, the partial light shielding element 110 according to the present embodiment has a feature of introducing the phase difference δ into entering light. Hereinafter, described is an advantage realized by this feature in the case where the objective lens 5 and the polarization hologram element 112 are displaced in a direction along the tracks of the optical disc. Here, for the sake of simple explanation, a case will be described where the partial light shielding element 110 emits the light entering the same while shifting the phase of the light by a phase difference π (δ).

Figure 4:
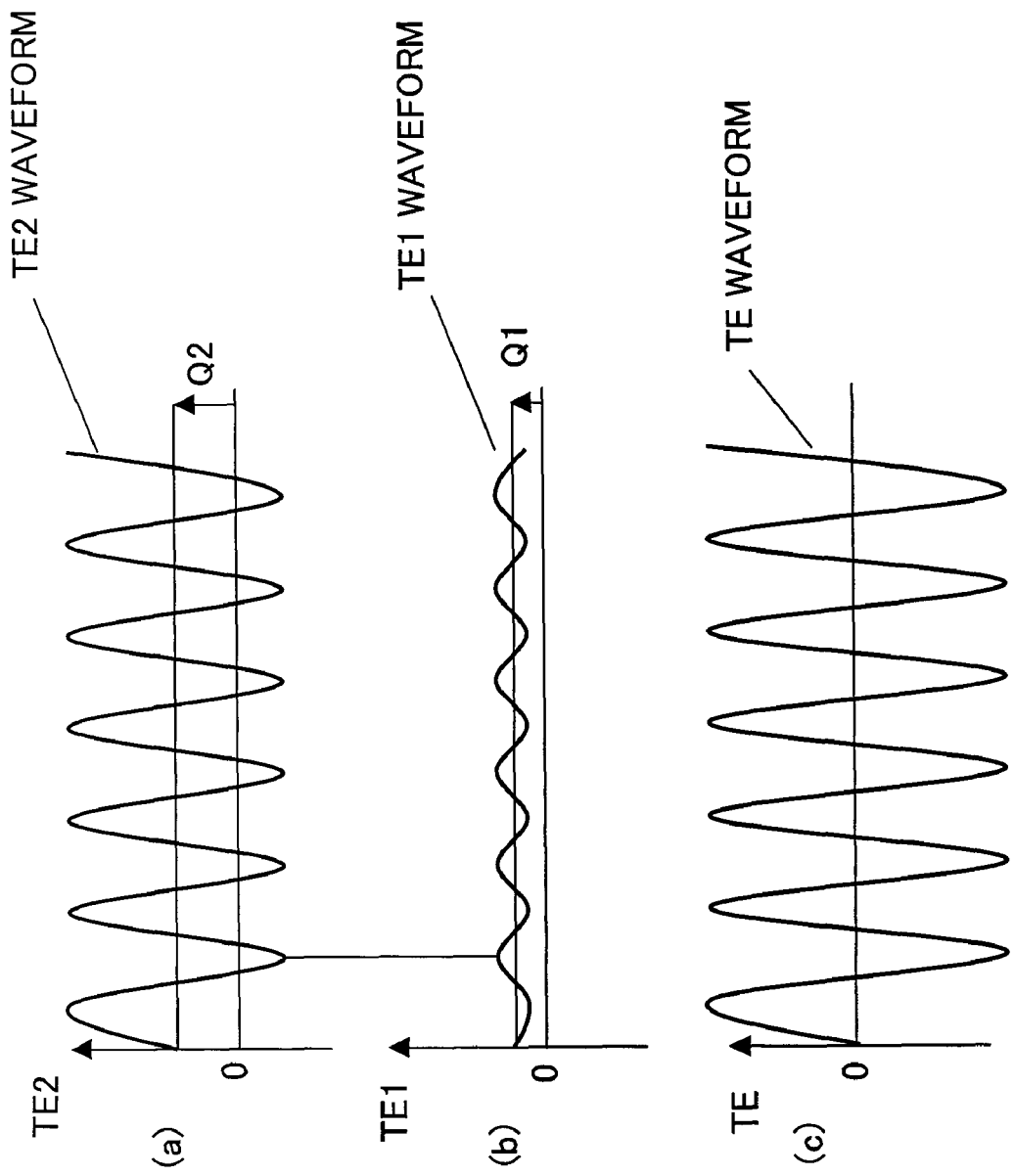
FIG. 4 is a diagram showing waveforms of a signal TE2 represented by formula (3), a compensation signal TE1 represented by formula (2), and a tracking error signal TE after offset compensation represented by formula (5).
Figure 5A:
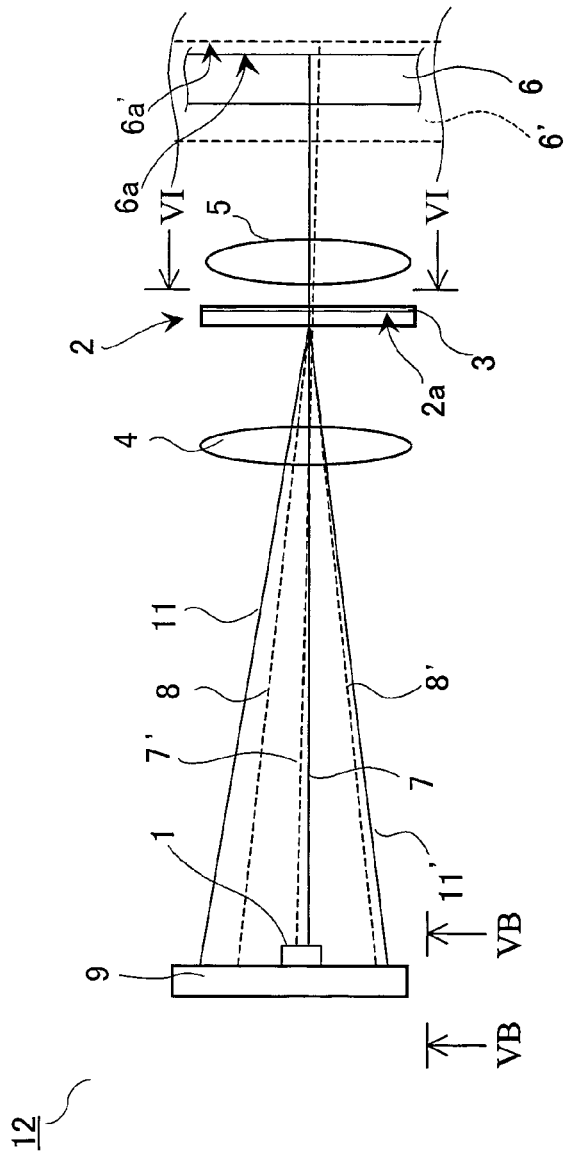
FIG. 5A is a side view showing a schematic configuration of an optical pickup device disclosed in patent document 1.
Figure 5B:
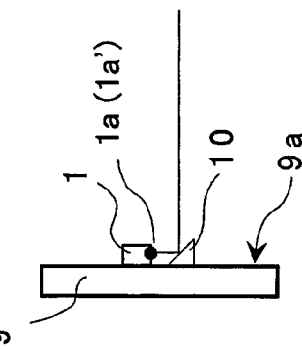
FIG. 5B is a diagram showing a light source portion shown in FIG. 5A as viewed from a VB-VB line.

FIG. 4(a) shows a waveform of the signal TE2 represented by formula (3), FIG. 4(b) shows a waveform of the compensation signal TE1 represented by formula (2), and FIG. 4(c) shows a waveform of the tracking error signal TE which is offset-compensated and is represented by formula (5).

A waveform of a sine wave of the signal TE2 shown in FIG. 4(a) represents a groove crossing waveform (so-called an AC component) that results from imbalanced intensity of the plus and minus first-order diffracted beams, the imbalance being caused by fluctuation in the relative position between a spot of light and a groove on the signal surface. The difference Q2 between the center of the sine wave and the line, where the value of the TE2 is zero, is the offset of the signal TE2, i.e., the offset (so-called a DC component) caused by the imbalanced zeroth-order diffracted beam.

On the other hand, the compensation signal TE1 has a waveform as shown in FIG. 4(b). As above described, the partial light shielding element 110 does not completely shield the second laser beam, and thus allows the first-order diffracted beams, which leak into the regions 121a, 122a, 123a, and 124a, to be partially transmitted therethrough (the AC component shown in FIG. 4(b)). The phase of the light transmitted through the partial light shielding element 110 is shifted by π with respect to the phase of the light transmitted through the opening of the partial light shielding element 110, and thus the groove crossing component (AC component) included in the compensation signal TE1 is in opposite phase to the groove crossing component (AC component) included in the signal TE2. Therefore, when the calculation section calculates formula (6), the offset (DC component) of the signal TE2 is substantially cancelled, and amplitude of the AC component is increased. Thus, with the partial light shielding element 110 according to the present embodiment, even if the objective lens 5 and the polarization hologram element 112 are displaced from each other, it is possible to improve the modulation degree of the tracking error signal TE utilizing the leaked-in first-order diffracted beams.

In order to obtain the amplification effect described with reference to FIG. 4(a) to (c), it is preferable that transmittance of the second laser through the partial light shielding element 110 is equal to or greater than 10% and equal to or less than 50%. When the transmittance is less than 10%, such a component that is in opposite phase to the signal TE2 is decreased, and the amplification effect of the tracking error signal TE deteriorates. On the other hand, the transmittance exceeding 50% affects convergence condition, adversely. In order to obtain the amplification effect of the tracking error signal TE without adversely affecting the convergence condition, it is more preferable that the transmittance of the second laser beam is set to about 30%. As above described, the transmittance through the partial light shielding element 110 is adjustable by selecting the refractive indices and thickness of the respective layers.

It is preferable that the phase difference δ introduced into the transmitted beam by the partial light shielding element 110 is equal to or greater than $(k\pi-\frac{1}{4}\pi)$ and equal to or less than $(k\pi+\frac{1}{4}\pi)$ (wherein, k is an odd number). When the phase difference δ is less than $(k\pi-\frac{1}{4}\pi)$, or when the phase difference δ is more than $(k\pi+\frac{1}{4}\pi)$, it is impossible to obtain sufficient amplification effect of the tracking error signal TE, the amplification effect being calculated based on formula (6). Further, in order to enhance the amplification effect of the tracking error signal TE, it is more preferable that the phase difference δ is equal to or greater than $(k\pi-\frac{1}{6}\pi)$ and equal to or less than $(k\pi+\frac{1}{6}\pi)$. Still further, most preferably, the phase difference δ is $k\pi$. In this case, the AC component of the signal TE1 is in opposite phase to the AC component of the signal TE2, and thus, the amplification effect of the tracking error signal TE is maximized.

When the phase of the first-order diffracted beams leaking into a light receiving region that receives the zeroth-order diffracted beam is shifted by π, the groove crossing waveform of the signal TE1 is in opposite phase to the signal TE2, and thus instead of the partial light shielding element 110, an optical element, which has no light shielding effect and introduces the phase difference π into the transmitted beam, may be provided. In this case, however, when the objective lens converges light beams which are returned through the optical system, only light beams whose phases are shifted by it respectively are converged, and thus a degree of convergence of a light spot on the optical disc may deteriorates. Therefore, it is not preferable to apply a configuration using the optical element which has no light shielding effect and introduces the phase difference π into the transmitted beam.

Further, the optical pickup device may be configured such that, instead of the partial light shielding element 110, a light shielding element which completely shields the second laser beam is provided so as not to allow the first-order diffracted beams to enter the light receiving region that receives the zeroth-order diffracted beam only. In this case, the objective lens 5, an opening film pattern of the light shielding element, and a region dividing pattern on the polarization hologram element need to be aligned one another accurately.

As above described, in the present embodiment, the light receiving region, which is on the hologram surface 112a and receives the zeroth-order diffracted beam from the optical disc, is partially covered with the partial light shielding element 110. With the use of the partial light shielding element 110, even when the light receiving region that receives the zeroth-order diffracted beam is enlarged, it is possible to partially shield the plus and minus first-order diffracted beams which are from the optical disc and leaking into the region due to displacement, for example, between the objective lens 5 and the polarization hologram element 112. As a result, it is possible to reduce the AC component included in the offset compensation signal TE1 based on the light diffracted by the light receiving region which receives the zeroth-order diffracted beam, and also possible to prevent deterioration in the modulation degree of the tracking error signal TE after compensated.

Further, when the partial light shielding element 110 causes the second laser beam to be partially transmitted therethrough, and causes the phase of the transmitted beam to be shifted by a predetermined phase difference δ, the DC component is offset and at the same time, the AC component is amplified when the signal TE2 is electrically compensated by the signal TE1. Therefore, it is possible to improve the modulation degree of the tracking error signal TE.

Therefore, according to the present invention, even if the objective lens 5 and the polarization hologram element 112 are displaced from each other, it is possible to realize an optical pickup device that performs excellently stable tracking control without causing deterioration in the modulation degree of the tracking error signal TE.

In the above description, the configuration and the function of the optical pickup device have been mainly described. It may be easily understood that the notion of the present invention is applicable to an optical disc device including the optical pickup device in a similar manner. In the case of applying the present invention to an optical disc device, component parts (such as a motor, a turntable, a disc clamper, and the like) excluding the optical pickup device are not particularly limited, and any available parts that are generally known may be applicable.

Further, the present invention may also be applicable to a device including any recording system which irradiates a rewritable phase-change optical disc, a read-only optical disc (ROM), an optical magnetic disc (MO), and the like with a laser beam so as to perform at least one of reading, writing and erasing of information.

Still further, the present invention may be applicable to an optical pickup device and an optical disc device which are compatible with multi-layer recording.

Still further, in the present embodiment, the partial light shielding element is formed in an integral manner with the polarization hologram element and the ¼ wavelength plate, but may be formed independently of the polarization hologram element.

Still further, in the above description, the pattern of the regions on the hologram surface and the pattern of the detection cells on the photo detector have been specifically described. However, these patterns may be changed as appropriate depending on the wavelength of the laser beam, design of the optical system, and the like. Even if the pattern on the hologram surface and that of the photo detector are different from the above described examples, it is possible to arrange the partial light shielding element according to the present invention so as to cover a part of the region on the hologram surface, the region receiving only the zeroth-order diffracted beam, provided that a method for generating the tracking error signal is the same as the above example. The shape of the partial light shielding element can be changed as appropriate depending on the pattern of the regions on the hologram surface.

INDUSTRIAL APPLICABILITY

The present invention is applicable to, for example, an optical pickup device, which performs recording, reproduction, erasure, and the like of information on an optical recording device with the use of a laser light source, and to an optical disc device including the optical pickup device.

The invention claimed is:

1. An optical pickup device performing at least one of reading, writing, and erasing of information on an optical recording medium, the optical pickup device comprising:
a light source for emitting a light beam having a first wavelength and a light beam having a second wavelength that is different from the first wavelength;
an objective lens system for converging, on a track of the optical recording medium, a light beam emitted from the light source;
a light branching section including a first region having a central axis of the objective lens system passing therethrough and a pair of second regions which are in contact with boundaries of the first region, for receiving a zeroth-order diffracted beam from the optical recording medium in the first region, and for receiving the zeroth-order diffracted beam and plus and minus first-order diffracted beams from the optical recording medium in the second region, when the light beam having the second wavelength is used, and for splitting the light beam having entered the first region and the second regions into a plurality of light beams;
an optical element which is disposed between the objective lens system and the optical branching section, and which covers a portion of the first region, the portion extending along the boundaries between the first region and the second regions;
a detection section for generating a first electrical signal based on intensity of the light beams split by the first region, and for generating a second electrical signal based on intensity of the light beams split by the first region and the second regions, when the light beam having the second wavelength is used; and
a calculation section for electrically compensating an offset component included in the second electrical signal by using the first electrical signal when the light beam having the second wavelength is used, and for generating a tracking error signal for tracking control,
wherein the optical element causes the light beam having the first wavelength to be transmitted therethrough, and causes the light beam having the second wavelength to be partially transmitted therethrough.

2. The optical pickup device according to claim 1, wherein the optical element emits the light beams received from the objective lens system while shifting phases of the light beams.

3. The optical pickup device according to claim 2, wherein a phase difference between a phase of a wave surface of a light beam transmitted through the optical element and a phase of a wave surface of a light beam transmitted through a portion where the optical element is not located is equal to or greater than $(k\pi - \frac{1}{4}\pi)$ and equal to or less than $(k\pi + \frac{1}{4}\pi)$, wherein k represents an odd number.

4. The optical pickup device according to claim 1, wherein transmittance property of the optical element with respect to the light beam having the second wavelength is equal to or greater than 10% and equal to or less than 50%.

5. An optical disc device including an optical pickup device performing at least one of reading, writing, and erasing of information on an optical recording medium,
wherein the optical pickup device comprises:
a light source for emitting a light beam having a first wavelength and a light beam having a second wavelength that is different from the first wavelength;
an objective lens system for converging, on a track of the optical recording medium, a light beam emitted from the light source;
a light branching section including a first region having a central axis of the objective lens system passing therethrough and a pair of second regions which are in contact with boundaries of the first region, for receiving a zeroth-order diffracted beam from the optical recording medium in the first region, and for receiving the zeroth-order diffracted beam and plus and minus first-order diffracted beams from the optical recording medium in the second region, when the light beam having the second wavelength is used, and for splitting the light beam having entered the first region and the second regions into a plurality of light beams;

an optical element which is disposed between the objective lens system and the optical branching section, and which covers a portion of the first region, the portion extending along the boundaries between the first region and the second regions;

a detection section for generating a first electrical signal based on intensity of the light beams split by the first region, and for generating a second electrical signal based on intensity of the light beams split by the first region and the second regions, when the light beam having the second wavelength is used; and a calculation section for electrically compensating an offset component included in the second electrical signal by using the first electrical signal when the light beam having the second wavelength is used, and for generating a tracking error signal for tracking control, and the optical element causes the light beam having the first wavelength to be transmitted therethrough, and causes the light beam having the second wavelength to be partially transmitted therethrough.

* * * * *